United States Patent [19]

Schnabel

[11] 4,331,410

[45] May 25, 1982

[54] TOOL FOR CUTTING LIPS OF STAKED BEARINGS AND BUSHINGS WITH RING-GROOVED FACES FOR RETENTION

[75] Inventor: Siegfried Schnabel, Bremen-Lesum, Fed. Rep. of Germany

[73] Assignee: Vereinigte Flugtechnische Werke-Fokker GmbH, Bremen, Fed. Rep. of Germany

[21] Appl. No.: 103,766

[22] Filed: Dec. 14, 1979

[30] Foreign Application Priority Data

Dec. 15, 1978 [DE] Fed. Rep. of Germany ....... 2854121

[51] Int. Cl.[3] ........................ B23B 41/12; B23B 47/18

[52] U.S. Cl. .................................. 408/94; 29/402.03; 408/82; 408/101

[58] Field of Search .................... 409/228; 408/82, 93, 408/94, 83.5, 101; 29/402.02, 402.03

[56] References Cited

U.S. PATENT DOCUMENTS

| | | | |
|---|---|---|---|
| 1,423,462 | 7/1922 | Sharpnack | 408/93 |
| 1,435,502 | 11/1922 | Sazer | 408/101 X |
| 1,940,420 | 12/1933 | Kerns | 408/101 X |
| 2,514,641 | 7/1950 | Harris, Sr. | 408/83.5 X |
| 4,017,201 | 4/1977 | Adams et al. | 408/82 |

*Primary Examiner*—Z. R. Bilinsky

*Attorney, Agent, or Firm*—Smyth, Pavitt, Siegemund & Martella

[57] ABSTRACT

The tool includes a mandrel on which is seated and axially held an exchangeable milling cutter, coupled to the mandrel by a clutch drive ring for shell end mill arbors, for transmitting the torque during the milling procedure. In addition, a stop element is mounted on the mandrel, held against an axial displacement, but permitting relative rotation of the mandrel for operating the cutter, whereby particularly a thrust bearing is used between the mandrel and the stop element. The stop element is adjustable and limits the longitudinal movement of the cutter. To prevent any damage to the chamfer-area around the housing-bore hole by the cutter, the stop has to be adjusted accurate to the gauge, in reference to the cutting edge geometry of the cutter teeth, so that just a thin blade of material of the outer ring lip remains. The whole device is centered with the mandrel in the bore of the bearing or bushing which is to be removed after cutting one ring lip. The cutting depth is adjusted by means of a nut on the mandrel-thread. The nut is integrated in a supporting bell with a thrust bearing, a shim ring and a retaining ring for shafts. During adjustment the non-co-rotating supporting bell is seated against the housing and pressed against it until the cutter-teeth, which rest against the ring lip of the bearing or bushing, have reached the required depth. The axial force resulting from the adjustment is transmitted via the supporting bell onto the fitting.

5 Claims, 1 Drawing Figure

TOOL FOR CUTTING LIPS OF STAKED BEARINGS AND BUSHINGS WITH RING-GROOVED FACES FOR RETENTION

BACKGROUND OF THE INVENTION

The present invention relates to the removal of bearings or bushings; and more particularly, the invention relates to the removal of such bearings or bushings which have been staked into bores, e.g., of aircraft parts such as fittings.

Bearings or bushings to be removed in accordance with the invention are basically comprised of a bearing or bushing having ring lips at its two ends which have been deformed for by staking. The positive axial positioning of the bearing or bushing in the double-sided chamfered bore of a fitting occurs by deforming the outer ring lips against the bore-chambers. At times, these bushings have to be removed, e.g., replaced, because they have been damaged, or are worn out, etc. Such a removal should be carried out without having to remove the fitting in which the bearing or bushing is inserted. This, however, has not always been possible in the past. The removal of the bearing or bushing requires specifically that one of the staked ring lips be cut out; the invention relates specifically to tooling accomplishing this objective.

DESCRIPTION OF THE INVENTION

It is an object of the present invention to provide a new and improved tool for the removal of staked bearings or bushings, such as bearings or bushings with ring-grooved faces on both ends for retention.

It is a specific object of the present invention to provide a new and improved tool for cutting the staked ring lip of a bearing or bushing to permit removal thereof from a bore.

In accordance with the preferred embodiment of the present invention, it is suggested to provide a mandrel with a tip, e.g., a threaded tip, upon which is mounted a first stop device being, for example, constructed as a threaded-on ring and including a tubular element, being held on the ring against axial displacement. A milling cutter is seated on the mandrel and is connected thereto by means of a clutch drive ring for shell end mill arbors while being held thereon against axial displacement. A second stop device including another tubular element being threaded on a sleeve is disposed on the mandrel in that the sleeve receives the mandrel and is held thereon against axial displacement. In addition, a thrust bearing is interposed between that sleeve and, e.g., a flange, on the mandrel adjacent to the end thereof to which torque is applied for operating the cutter.

It can readily be seen that torque is not applied to the cutter via biased, threaded nuts. While cutting-by-milling neither threaded parts nor threaded connections transmit any torque. Threaded parts are designed to take up only axial thrust.

DESCRIPTION OF THE DRAWINGS

While the specification concludes with claims particularly pointing out and distinctly claiming the subject matter which is regarded as the invention, it is believed that the invention, the objects and features of the invention, and further objects, features, and advantages thereof, will be better understood from the following description taken in connection with the accompanying drawings in which:

Specifically FIG. 1 shows a part, such as a fitting 1, having an eye, a lug, an extension, etc., provided with a bore in which a bearing or bushing 2 has been inserted, and along whose chamfered edges lips have been pressed by a staking operation. Now, it is assumed that this bearing or bushing is to be removed, e.g., for being replaced with another one. A tool for such replacement staking is disclosed in my copending application (D-6745) Ser. No. 097,153 filed Nov. 26, 1979; before the tool disclosed in the copending application can be used, the old bearing or bushing is to be removed, which is the purpose of the tool presently described.

Figure 1:
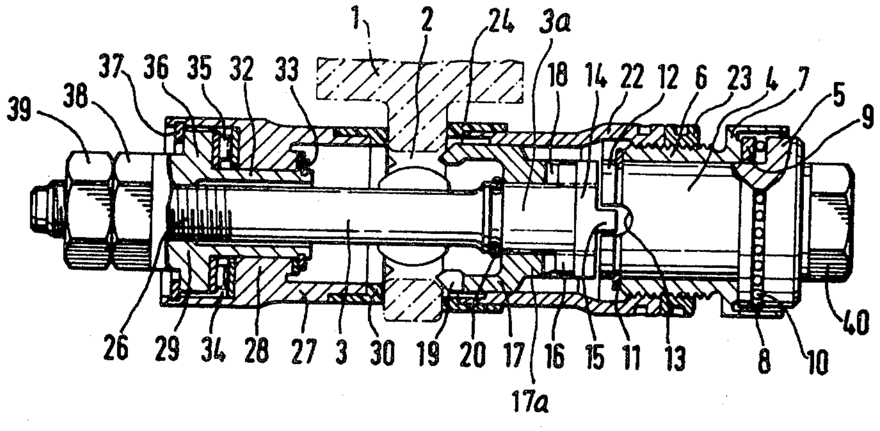
FIG. 1 is a cross-section through a cutting tool constructed in accordance with the preferred embodiment of the invention and constituting the best mode of practicing same.

The lip cutter as depicted includes a mandrel 3 which extends from a collar element or cylindrical support 4, being part of the mandrel. The mandrel has a four-fold function: (a) it supports a cutting tool 17; (b) it provides for the actuation of that cutting tool; (c) it receives a supporting bell 27 against which part 1 bears during cutting; and (d) it supports and positions a stop element 22 to signal that termination of the cutting process is desired when this stop element comes to bear against part 1.

As far as the support of the cutting tool, 17, on mandrel 3 is concerned, this tool has a cylindrical portion or sleeve 17*a* which sits on a collar portion 3*a* of the mandrel and is secured against any axial displacement by means of a clamping ring 20.

Torque is transmitted from the mandrel to the cutter by means of a clutch drive ring for shell end mill arbors 14. A shoulder portion 12 of collar 4 is provided with two oppositely located keyways 13 into which reach appropriately positioned parallel keys 15 of the clutch drive ring, 14. Clutch drive ring 14 is provided with two parallel keys 16 on its other side; and these parallel keys are each displaced by 90° to parallel keys 15. Parallel keys 16, in turn, are inserted in key ways 18 of the cylindrical or tubular portion 17 of the cutter.

It can, thus, be seen that cutter 17 follows any rotation of mandrel 3 and of collar 4 thereof. This rotation is provided as an actuation function and is imparted upon the mandrel through a hex screwhead 40 at the end of collar 4. An appropriate wrench, or the like, when engaging key screwhead 40 permits the transmission of torque upon, ultimately, cutter 17.

Cutter 17 is provided with cutting teeth 19, each tooth having an inwardly as well as an outwardly tapered configuration to thereby define a first cutting angle of 45° on account of the outward taper, whereas the inwardly oriented taper provides a cutting angle of 30°, these angles being measured in relation to a direction along, or parallel to, the axis of the assembly, in particular of mandrel 3. The cutter teeth, 19, are thus actually provided for a milling-type cutting operation so that, upon rotation and engagement with a bearing or bushing lip, the lip will actually be destroyed in chips so far, that just a thin blade of material of the outer ring lip remains, after the final cut.

As far as the third function of mandrel 3 is concerned, receiving support of supporting-bell 27, the end of mandrel 3 is provided with a thread onto which a nut 29 has been mounted by threading. Nut 29 is provided with a tubular extension 32 which overlaps an unthreaded portion of the mandrel and supports tube 27, in particular a flange portion 28 thereof. A retaining ring for shafts 33 retains element 27, flange 28 and thrust bearings 35, on the tubular extension 32. A recess portion 34 of flange 28 is provided for accommodating needle or roller thrust bearings 35, held additionally against collar portion 36 of nut 29. A retaining ring for shafts 37 holds the parts, particularly the bearings, from the other (axial) side.

The nut, 29, is provided with an integral hex.screw-head 38, serving actually for facilitating the threading of nut 29 onto the mandrel tip. A counter nut 39 holds nut 29 on mandrel 3 so that upon rotation of the latter, the former will not be threaded loose.

It can thus be seen that supporting-bell 27 is held against axial displacement by threaded-nut 29; but the two elements can rotate against each other.

The front end of supporting bell 27 is provided with a plastic, i.e., synthetic ring 30, sitting on supporting bell 27 for protectionally engaging directly part 1. Ring 30 protects particularly part 1, whenever supporting bell 27 serves as a thrust support during the cutting operation.

The forth support function of mandrel 3 concerns the cut stop element 22. This element is threaded onto a sleeve 6. Sleeve 6 is loosely seated on collar 4 and is provided with an extension 7 having a larger diameter, thereby defining an annular gap space 8. A bearing ring 9 is affixed to sleeve 6 adjacent to space 8 to define one race for a thrust bearing which includes balls 10 as well as a flange 5 on collar 4. Retaining ring for shafts 11 in a groove holds the sleeve 6 on collar 4 against axial displacement.

The stop element 22 is secured against rotational, axial displacement on sleeve 6 by means of a counter nut 23. The front end of element 22 is provided with a plastic ring 24 to avoid damage to part 1 upon abutment. Element 22 and sleeve 6 co-rotate when the mandrel is turned.

As soon as the plastic stop contacts part 1, they remain stationary.

The device as described operates as follows. Initially, nut 29 and associated equipment including the supporting bell are off the mandrel so that the mandrel can be inserted into and through the ball-shaped joint element in bearing or bushing 2 which is to be removed. Mandrel 3 is advanced until the cutting teeth 19 engage the lip to be cut. Stop 22 has been threaded onto sleeve 6 so that the front end plane of the abutment ring 24 is spaced from the front end cutting plane (tips of teeth 19) by a distance which is adjusted accurately to gauge, whereby damaging of the chamfer at the fitting bore hole is prevented.

Next, the assembly (29 to 27) is threaded onto the tip portion of mandrel 3 until the front end of ring 30 abuts part 1 and is tightened. The adjusted axial portion of supporting bell 27 actually determines and subdivides the full range of permissible advance of the cutter, and limits the depth of cutting of the stepwise milling process. Thereafter, counter nut 39 is threaded onto the mandrel against nut 29/38 to positively position assemblies 27 and 29 and to prevent their displacement.

The tool is now ready, and cutting can commence by applying a wrench to the key element and mandrel head 40. A groove is now milled into the bearing or bushing lip material.

It can readily be seen that any threaded portion of the tool is not loaded by the torque transmission. Turning of the mandrel by means of the wrench causes torque transmission upon the milling cutter via clutch drive ring 14, acting as follower disk, and its parallel keys. The threaded portions, namely, the threaded connection between stop 22 and sleeve 6 as well as the threading of nut 29 onto the mandrel, is not subjected to any torque, particularly on account of thrust bearing elements 5-9-10 and 28-35-36. Only axial forces act upon the threads, but only to the extent that the plastic stop elements 24 and 30 engage axially part 1.

Cutting will proceed while ring 30 yields. Nut 39 is now loosened to permit hex head 38 to advance for tightening, again, ring 30 against part 1. Thereupon, cutting and milling proceeds further. These operations will be continued in steps until the front end of stop ring 24 abuts part 1. Milling comes to an end at that point since the cutter teeth will not be able to carve any further into the lip material. This stopping condition is readily noticeable to the operator, turning the mandrel. The lip has not been quite cut through at this point, the reason being to avoid cutting into part 1. The assemblies 27, 29, 38, etc., are now unthreaded from the threaded tip portion of mandrel 3; and the latter is withdrawn, together with the cutter, etc. Bearing or bushing 2 can now be pushed out easily, towards the left of the drawing. The residual material of the lip which has not been milled off can readily be bent inwardly during the pushing process.

It can readily be seen that the cutter, 17, can be replaced, e.g., after having been broken or worn out. Of course, the stop elements 22 and 24, and counter-ring nut on sleeve 6, may have to be readjusted to gauge.

Instead of hex nuts, etc., (38 and 39), one may use a handle lever, or the like, to permit threading on and off and/or adjustment of the requisite stroke length without additional tooling.

The invention is not limited to the embodiments described above; but all changes and modifications thereof, not constituting departures from the spirit and scope of the invention, are intended to be included.

I claim:

1. A tool for cutting away the lips of sleeves staked into bores of parts;

a mandrel having a threaded tip and a means on its other end for applying torque;

support means threaded onto said threaded tip;

a first stop element rotatably mounted onto the support means as threaded onto the tip of the mandrel and held on the support means against axial displacement for providing engagement with a part from which a staked sleeve is to be removed;

a milling cutter, having a hollow portion, receiving the mandrel and being held thereon against axial displacement;

a follower means for coupling the cutter to the mandrel so that the cutter turns with the mandrel, and torque is transmitted from the mandrel to the cutter by the follower means;

a sleeve on the mandrel, held against axial displacement;

a second stop means threaded onto the sleeve and held thereon against axial displacement for engagement with the part from the side of cutting, opposite a side of engagement by the first stop means for limiting the total depth of cutting; and a thrust-bearing means interposed between the mandrel during relative rotation thereof, upon operating the cutter by rotating the mandrel.

2. The tool as in claim 1, the said follower means including a disk with keys on opposite sides, the keys on one side being angularly displaced from the keys on the other side, the keys engaging recesses in, respectively, the cutter and the mandrel.

3. The tool as in claim 2, said mandrel having a collar being provided with the recesses of the mandrel, the cutter having a tubular portion seated on the mandrel and having the angularly displaced recesses.

4. The tool as in claim 1, the support means including a ring threaded onto the mandrel tip, the first stop means including a tubular element with an inwardly directed flange, there being a needle-thrust-bearing means interposed between the flange and the ring; and
a means for holding the tubular element on the ring against axial displacement.

5. The tool as in claim 1, the cutter having teeth; each tooth having an inwardly and an outwardly tapering surface, having respectively an angle of 30° and 45° to an axis of the mandrel, being also a rotational axis for the cutter.

* * * * *